United States Patent [19]

Duecker

[11] Patent Number: 5,881,194

[45] Date of Patent: Mar. 9, 1999

[54] RADIATION-CURED MATRIX MATERIAL; OPTICAL FIBER RIBBONS CONTAINING SAME; AND PROCESS FOR PREPARING SAID OPTICAL FIBER RIBBONS

[76] Inventor: David Clarke Duecker, 4714 Greenlee Ave., Cincinnati, Ohio 45217

[21] Appl. No.: 187,006

[22] Filed: Mar. 17, 1994

Related U.S. Application Data

[62] Division of Ser. No. 13,207, Feb. 1, 1993, abandoned, which is a continuation of Ser. No. 915,742, Jul. 21, 1992, abandoned, which is a continuation of Ser. No. 733,074, Jul. 18, 1991, abandoned, which is a continuation of Ser. No. 371,833, Jun. 27, 1989, abandoned.

[51] Int. Cl.$^6$ .............................. G02B 6/04; G02B 6/16; C08F 2/50
[52] U.S. Cl. ........................ 385/115; 385/123; 427/500; 427/503; 427/514; 427/515; 427/517; 522/90; 522/96
[58] Field of Search .................................. 385/115, 145, 385/123; 522/90, 93, 97, 96, 81; 427/500, 503, 514, 515, 517

[56] References Cited

U.S. PATENT DOCUMENTS

| | | |
|---|---|---|
| 3,411,010 | 11/1968 | Genahr et al. . |
| 3,912,516 | 10/1975 | Recchia et al. . |
| 4,065,587 | 12/1977 | Ting . |
| 4,116,786 | 9/1978 | Hodakowski . |
| 4,123,137 | 10/1978 | Marcatili . |
| 4,130,708 | 12/1978 | Friedlander et al. . |
| 4,131,602 | 12/1978 | Hodakowski et al. . |
| 4,133,723 | 1/1979 | Howard . |
| 4,139,436 | 2/1979 | Jasani . |
| 4,176,190 | 11/1979 | Noethe . |
| 4,188,455 | 2/1980 | Howard . |
| 4,246,379 | 1/1981 | Howard . |
| 4,324,575 | 4/1982 | Levy . |
| 4,326,010 | 4/1982 | Bauer . |
| 4,369,300 | 1/1983 | Carter et al. . |
| 4,435,461 | 3/1984 | Gray, III et al. . |
| 4,438,190 | 3/1984 | Ishimaru et al. . |
| 4,462,286 | 7/1984 | Kolychek et al. . |
| 4,472,021 | 9/1984 | Ansel et al. . |
| 4,477,548 | 10/1984 | Harasta et al. . |
| 4,496,210 | 1/1985 | Ansel et al. . |
| 4,496,686 | 1/1985 | Ansel . |
| 4,512,340 | 4/1985 | Buck . |
| 4,533,445 | 8/1985 | Orio . |
| 4,567,107 | 1/1986 | Rizk et al. . |
| 4,588,787 | 5/1986 | Kordomenos . |
| 4,600,649 | 7/1986 | Leo . |
| 4,608,409 | 8/1986 | Coady et al. ............................. 522/97 |
| 4,610,746 | 9/1986 | Broer et al. . |
| 4,629,287 | 12/1986 | Bishop . |
| 4,697,877 | 10/1987 | Hida et al. . |
| 4,701,016 | 10/1987 | Gartside, III et al. ............... 350/96.23 |
| 4,707,076 | 11/1987 | Skutnik et al. . |
| 4,717,739 | 1/1988 | Chevreux et al. . |
| 4,733,941 | 3/1988 | Broer et al. . |
| 4,733,942 | 3/1988 | Hida et al. . |
| 4,738,509 | 4/1988 | Broer et al. . |
| 4,744,631 | 5/1988 | Eichenbaum et al. . |
| 4,762,751 | 8/1988 | Girgis et al. . |
| 4,786,586 | 11/1988 | Lee et al. . |
| 4,806,574 | 2/1989 | Krajewski et al. . |
| 4,849,462 | 7/1989 | Bishop . |
| 4,889,768 | 12/1989 | Yokoshima et al. . |
| 4,900,126 | 2/1990 | Jackson et al. ...................... 350/46.23 |

FOREIGN PATENT DOCUMENTS

| | | |
|---|---|---|
| 0114982 | 12/1982 | European Pat. Off. . |
| 0111280 | 6/1984 | European Pat. Off. . |
| 0157396 | 10/1985 | European Pat. Off. . |
| 0157540 | 10/1985 | European Pat. Off. . |
| A 194891 | 9/1986 | European Pat. Off. . |
| 6131330 | 7/1984 | Japan . |
| A 63-275619 | 4/1987 | Japan . |
| A 63-281109 | 11/1988 | Japan . |
| A1-153710 | 6/1989 | Japan . |
| 2170497 | 8/1986 | United Kingdom . |

OTHER PUBLICATIONS

Sales Records provided by Opposer for Desolite® 950–700 and Desolite® 950–701.
Description of Desolite® 950–700 and 3036–114E.
Description of Desolite® 950–701 and 950–080.
Material Safety Data Sheet of DC 1248.
Fiber Optics Technology and Applications, pp. 26–33, Stewart D. Personick.
International Wire & Cable Symposium Proceedings, 1981, pp. 388–395, Morin et al.

*Primary Examiner*—Susan W. Berman
*Attorney, Agent, or Firm*—Roylance, Abrams, Berdo & Goodman, L.L.P.

[57] ABSTRACT

A radiation-curable matrix material for affixing coated and inked optical fibers in a ribbon configuration is disclosed. The material comprises an aliphatic polyether-based urethane acrylate; a monomer having a plurality of acrylate or methacrylate moieties; an alkyl acrylate or methacrylate; and an optional photoinitiator. Also disclosed are an optical fiber ribbon prepared therefrom; a process for preparing such ribbon; and a radiation-curable coating composition generally applicable for coating a substrate.

14 Claims, No Drawings

RADIATION-CURED MATRIX MATERIAL; OPTICAL FIBER RIBBONS CONTAINING SAME; AND PROCESS FOR PREPARING SAID OPTICAL FIBER RIBBONS

This application is a division of application Ser. No. 013,207, filed in Feb. 1, 1993, now abandoned, which application was a continuation of Ser. No. 915,742, filed Jul. 21, 1992, now abandoned, which was in turn a continuation of Ser. No. 733,074, filed Jul. 18, 1991, now abandoned, which was in turn a continuation of Ser. No. 371,833, filed Jun. 27, 1989, now abandoned.

BACKGROUND OF THE INVENTION

The present invention relates to radiation-curable compositions useful when cured as matrix material for optical fiber ribbons; to optical fiber ribbons containing such matrix material; and to processes for preparing such matrix-containing ribbons.

Optical glass fibers have revolutionized the telecommunications industry. The result has been a tremendous growth in demand for optical fibers which are free of many of the inherent defects of glass fibers.

Immediately after drawing, glass fibers are exceptionally strong and have very few intrinsic defects. However, such pristine fibers are very easily flawed by exposure to environmental conditions including dust and moisture. Therefore, there have been developed in the prior art numerous coatings which are minimally capable of protecting the underlying glass fiber from external harmful forces and which optimally possess properties rendering them capable of obviating one or more of the various potential problems which may deleteriously effect optical fiber performance. Such properties include, inter alia, a glass transition temperature rendering the fiber useful over a large potential temperature use range; a higher refractive index than that of the fiber to refract any errant light signals away from the fiber; rapid cure, e.g., under ultraviolet irradiation; and high impermeability to moisture which may damage the coating or the fiber itself and may cause delamination of the two. Additionally, the adhesion level between the fiber and the coating must be optimized so that the coating will remain adhered to the fiber during use but be easily stripped therefrom, with minimal damage to the integrity of the fiber and the coating, so that the fibers may be easily spliced in the field. Above all, the fiber coatings should display good thermal, oxidative and hydrolytic stability, to protect the underlying fiber over the long term, i.e., over twenty-five years' time.

In certain applications, such as in short haul, fiber-to-the-home uses, a single, coated optical fiber may adequately transmit a signal from one point to the next. However, in most embodiments, a relatively large number of fibers are necessary to transmit a large volume of signals. For example, in the telecommunications industry, aggregates of fibers spanning oceans or continents and containing dozens of individual fibers may be required. Fibers are conveniently aggregated into cables, wherein large numbers of coated optical fibers are laid in parallel and are protected by a common sheathing material such as a layered arrangement which may include fiberglass, steel tape and reinforced rubber cabling material.

When numerous individual coated optical fibers are aggregated into a cable, it is necessary to be able to identify each of the individual fibers. For example, when two cable segments are to be spliced together, it is necessary to splice together ends of each like optical fiber in order for a signal to convey properly. When only a few fibers are contained in a cable, identification may be adequately made by having the coating of each individual fiber be a characteristic color; thus, the splicer may simply match up green fiber to green fiber, red to red, and so forth.

However, when the cable contains one hundred or more fibers, it may become impracticable to use a sufficient number of distinctive inks as to color each fiber distinguishably. Thus, a geometric means of distinguishing each fiber is used. For example, arranging the fibers in a number of layers, each layer containing perhaps twelve ink-coated fibers of different respective colors, will greatly facilitate the task of matching up fibers when splicing.

One practical way by which such spatial ordering of numerous fibers may be accomplished is to create two-dimensional fiber arrays, wherein fibers are situated in a generally planar arrangement, within a given array, with the fibers in the array disposed in parallelism with each other. These arrays are stacked one atop another in a three dimensional structure.

Such arrays are known in the art as ribbons. For example, it is known to prepare a two-dimensional ribbon by forming a "sandwich" of parallel coated optical fibers between two sheets of adhesive-coated Mylar tape, thus affixing the fibers in that configuration. This "sandwich" provides structural integrity and a tack free exterior surface.

However, this arrangement is less than optimal because the tape occupies a substantial proportion of the total volume of the sandwich, so that when several "sandwiches" are stacked to form a cable, an undesirably high proportion of the total cable volume is taken up by tape (rather than by optical fiber).

Thus it has been envisioned to prepare an optical fiber ribbon having a matrix material in which the optical fibers are embedded in the desired generally planar, parallel arrangement. This matrix material should, inter alia, have suitable glass transition temperature; cure rapidly; be non-yellowing; and have high thermal, oxidative and hydrolytic (moisture) stability.

Additionally, the matrix material must be adherent enough to the coated, colored optical fibers to prevent separation of the fibers during processing into cables, but not so adherent as to remove the ink coloration from the individual ink-colored fibers when the matrix material is stripped from the fibers to permit splicing. Removal of the ink from a coated, colored optical fiber is referred to in the industry as "breakout failure"; it makes identification of the individual fibers impossible.

Furthermore, the matrix material must possess solvent resistance, inasmuch as, in the field, splicers typically remove residual matrix and coating material from stripped fibers using a solvent such as trichloroethane or ethanol. Matrix material on an unstripped fiber should not absorb solvent and swell and thus compromise the integrity of ribbon.

SUMMARY OF THE INVENTION

Accordingly, the invention provides, in one embodiment, a radiation-curable matrix composition for affixing coated and ink-colored optical fibers in a ribbon configuration. The matrix composition generally comprises:

(a) from about 35 percent to about 98 percent by weight of an aliphatic polyether-based urethane acrylate;

(b) from about 0.5 percent to about 35 percent by weight of a monomer having a plurality of acrylate or methacrylate moieties per monomer molecule;

(c) from about 0.5 percent to about 20 percent by weight of an acrylate or methacrylate monomer having an alkyl moiety comprising from 7 to 18 carbon atoms; and (d) from about 0 percent to about 10 percent by weight of a photoinitiator, all of the percentages by weight being based on the total weight of (a), (b), (c) and (d).

In preferred embodiments, the polyether-based urethane acrylate is silicone modified; and the matrix material additionally comprises a stabilizer, is ultraviolet curable and comprises at least about 1 percent by weight of the photoinitiator.

In an alternate embodiment, the material includes from about 1 percent to about 30 percent of an adhesion increasing compound such as a polyester-based aliphatic urethane acrylate oligomer in addition to the alkyl-containing acrylate-functional monomer (c).

In another embodiment, then, the invention is a process for adjusting the adhesive bond of a cured matrix material to glass optical fibers which are coated with a coating comprising a cured acrylate-or methacrylate-containing coating composition and colored by the application of inks of different respective colors for fiber identification, by incorporating into an uncured matrix material as described above a component that is capable of increasing the adhesive bond.

In another embodiment, the invention is an optical fiber ribbon assembly comprising a plurality of coated, colored optical fibers in a fixed relationship, e.g., a generally planar, generally parallel arrangement, and a radiation-cured matrix material bonding said fibers in said position within the matrix material. The matrix material has sufficient adhesion to the fibers to remain adhered thereto during use but is easily strippable therefrom. Specifically, the invention may be such an optical fiber ribbon wherein the matrix material is as described above.

In yet another embodiment, the invention is a process for preparing an optical fiber ribbon. The process comprises mechanically aligning the optical fibers in the desired (e.g., generally parallel) arrangement; applying about the fibers the matrix material described above; and curing the matrix material to secure the fibers in the desired arrangement, e.g., preferably with ultraviolet light or an electron beam.

In a still further embodiment, the invention is a coating composition for coating a substrate, the composition being as described above.

DESCRIPTION OF THE PREFERRED EMBODIMENTS

Radiation Curable Matrix Composition

The invention relates in part to a radiation-curable matrix composition, e.g., for affixing coated and inked optical fibers in a ribbon or other desired configuration. The cured matrix material should have, inter alia, the following properties: moisture resistance; solvent resistance; ease of stripping; resistance to breakout failure; low volatiles content; fast cure when irradiated; and long term thermal, oxidative and hydrolytic stability. It should be non-yellowing. It should also be resistant to failure during "cabling". Cabling is the term used to describe a process of gathering a plurality of the ribbons together to form a cable.

The matrix composition contains at least three basic ingredients, and, if envisioned for ultraviolet cure, at least four:

(a) a polyether-based urethane acrylate;
(b) a monomer having a plurality of acrylate or methacrylate groups;
(c) an alkyl acrylate or an alkyl methacrylate monomer; and (d) optionally, for a U.V.-curable composition, a photoinitiator.

(A) The Polyether-Based Urethane Acrylate

The first ingredient is a specific urethane acrylate. Specifically, it is based on an aliphatic polyether polyol, which is reacted with an aliphatic polyisocyanate and acrylated.

In a preferred embodiment, this component is an oligomer which is silicone-modified, e.g., it may have silicone coreacted into the polyether portion of the backbone. The silicone-modified alternative may provide the most desirable release characteristics vis-a-vis the ink (i.e., may exhibit less adhesion than the non-silicone-containing urethane acrylate).

This component is chosen to possess good thermal and hydrolytic properties and a low glass transition temperature, and to be somewhat non-yellowing.

The polyether-based urethane acrylate comprises from about 35 percent to about 98 percent by weight of the matrix composition, based on the total weight of the (a) through (d) ingredients. Preferably, the (a) component comprises from about 53 percent to about 87.5 percent, and more preferably about 64 percent to about 80 percent by weight of the composition, based upon the total weight of the (a) through (d) ingredients. If less than about 35 percent by weight of this component is used, the release properties of the matrix may suffer. If more than about 98 percent by weight is used, the viscosity of the composition may be undesirably high and swelling may occur when the matrix is exposed to certain solvents which may be used in the field and which may be absorbed by the matrix, such as ethanol, trichloroethane or isopropyl alcohol.

Examples of suitable urethane acrylates (a) include but are not limited to Ebecryl 4842 (equivalent to Chempol 19-4842), which is a silicone-modified compound, and Ebecryl 19-6264, which is not silicone-modified, and which contains about 15% by weight of 1,6-hexanediol diacrylate as a reactive solvent, both from Radcure Specialties, Inc., Louisville, Ky.

(B) The Monomer Having A Plurality of Acrylate or Methacrylate Groups

The second component of the matrix composition is a monomer having a plurality of acrylate or methacrylate moieties.

This component, which may be difunctional or higher but which is preferably trifunctional, serves to increase the crosslink density of the cured coating and therefore to improve solvent resistance (by preventing absorption of solvent into the matrix) and to increase modulus. Examples of suitable components (b) include but are not limited to trimethylolpropane triacrylate; trimethylolpropane trimethacrylate; pentaerythritol triacrylate; pentaerythritol trimethacrylate; pentaerythritol tetraacrylate; pentaerythritol tetramethacrylate; trimethylolpropane propoxylate triacrylate; trimethylolpropane propoxylate trimethacrylate; trimethylolpropane ethoxylate triacrylate; trimethylolpropane ethoxylate trimethacrylate; glycerol propoxytriacrylate; glycerol propoxytrimethacrylate; dipentaerythritol monohydroxy pentaacrylate; dipentaerythritol monohydroxy pentamethacrylate; $C_6$–$C_{12}$ hydrocarbon diol diacrylates; $C_6$–$C_{12}$ hydrocarbon diol dimethacrylates; and mixtures thereof. A preferred component (b) is trimethylolpropane triacrylate.

The monomer having a plurality of acrylate or methacrylate functionalities comprises from about 0.5 percent to about 35 percent by weight of the composition, based on the total weight of (a), (b), (c) and (d). Preferably, it comprises from about 10 percent to about 25 percent, and more preferably from about 15 percent to about 21 percent by weight of the composition, again based on total weight of (a) through (d). If less than about 0.5 percent by weight of component (b) is used, insufficient crosslink density, low modulus and poor solvent resistance may result; if more than about 35 percent is used, the cured composition may shrink to such an extent that adhesion may suffer (i.e., the matrix material may shrink away from the coated and inked optical fibers).

(C) The Alkyl Acrylate or Alkyl Methacrylate Monomer

The third component of the matrix composition is an acrylate or methacrylate monomer having an alkyl moiety comprising from 7 to 18 carbon atoms.

One of the key features of the present invention is its optimized adhesion level, i.e., it has a high enough adhesion level to remain adhered under virtually all use conditions yet low enough to render it easily strippable for splicing. Further, the adhesion level of the matrix to the coated and inked fibers is variable, as discussed in further detail hereinbelow, to meet different use conditions.

This third component (c) is instrumental in conferring release properties to the matrix material vis-a-vis the coated, inked optical fibers. As discussed above, it is necessary that a field worker is able to peel away the matrix material without removing the ink which identifies the underlying coated optical fibers, in order to splice the fibers together correctly. Furthermore, the inclusion of this third component increases the hydrolytic stability of the matrix material relative to that of the composition not including it. Thus, even in an embodiment, discussed infra, wherein increased (rather than decreased) adhesion is required, this adhesion decreasing component should be used in addition to a further component that is capable of overriding this adhesion decreasing property, the adhesion-increasing component replacing a portion of the polyether urethane acrylate component (a).

In either embodiment, the adhesion level of matrix material to ink should fall within the range of between about 0.02 pounds per linear inch (lb./in.) and about 0.20 lb./in.; preferably between about 0.04 lb./in. and about 0.15 lb./in.; and more preferably between about 0.06 lb./in. and about 0.10 lb./in., as measured on a one-inch wide sample by a T-peel test, using an Instron, model 1122, at 23° C., with a 10 mm/min crosshead speed.

Examples of such monomers include but are not limited to stearyl acrylate; stearyl methacrylate; isooctyl acrylate; isooctyl methacrylate; lauryl acrylate; lauryl methacrylate; $C_{14}$ to $C_{15}$ hydrocarbon diol diacrylates; $C_{14}$ to $C_{15}$ hydrocarbon diol dimethacrylates; caprolactone acrylate; caprolactone methacrylate; decyl acrylate; decyl methacrylate; isodecyl acrylate; isodecyl methacrylate; isobornyl acrylate; isobornyl methacrylate; and mixtures thereof. Of the above, those having straight chain alkyl groups of from 12 to 18 carbon atoms are preferred. Particularly preferred is stearyl acrylate, such as Sartomer SR-257 stearyl acrylate from the Sartomer Company of West Chester, Pa.

The alkyl-functional acrylate or methacrylate monomer (c) comprises from about 0.5 percent to about 20 percent by weight of the matrix composition, based on the total of the weights of components (a) through (d). Preferably, it comprises from about 1 to about 14 percent by weight and more preferably about 3 to about 8 percent by weight of the composition, based on the total weight at (a), (b), (c) and (d). As mentioned supra, if less than about 0.5 percent by weight of this component is used, hydrolytic stability may suffer. If more than 20 percent is used, crosslink density may be undesirably low, causing swelling of the matrix material due to solvent absorption when exposed to solvent in the field.

(D) The Photoinitiator

The fourth component of the matrix composition is a photoinitiator. The necessity for this component depends on the envisioned mode of cure of the matrix material: if it is to be ultraviolet cured, a photoinitiator is needed; if it is to be cured by an electron beam, the composition may comprise substantially no photoinitiator.

In the ultraviolet cure embodiment, the photoinitiator, when used in a small but effective amount to promote radiation cure, must provide reasonable cure speed without causing premature gelation of the matrix composition. Further, it must not interfere with the optical clarity of the cured matrix material. Still further, the photoinitiator must itself be thermally stable, non-yellowing, and efficient.

Suitable photoinitiators include, but are not limited to, the following: hydroxycylohexylphenyl ketone; hydroxymethylphenylpropanone; dimethoxyphenylacetophenone; 2-methyl-1-[4-(methylthio) phenyl]-2-morpholinopropanone-1; 1-(4-isopropylphenyl)-2-hydroxy-2-methylpropan-1-one; 1-(4-dodecylphenyl)-2-hydroxy-2-methylpropan-1-one; 4-(2-hydroxyethoxy)phenyl-(2-hydroxy-2-propyl)ketone; diethoxyacetophenone; 2,2-di-sec-butoxyacetophenone; diethoxy-phenyl acetophenone; and mixtures of these.

The photoinitiator comprises from about 0 percent to about 10 percent by weight of the composition, based upon the weight of composition of the (a) through (d) ingredients (0 percent representing the electron beam-curable embodiment). In the ultraviolet curable embodiment, the photoinitiator comprises from about 1 percent to about 10 percent by weight of the composition, based on (a) through (d). Preferably, the amount of photoinitiator, when used, is from about 1.5 percent to about 8.0 percent, and more preferably from about 2.0 percent to about 7.0 percent by weight, based upon the total weight of the (a) through (d) ingredients. A particularly preferred photoinitiator is hydroxycylcohexylphenyl ketone, such as is supplied by Ciba-Geigy Corp., Ardsley, N.Y., as Irgacure 184.

The photoinitiator should be chosen such that cure speed, as measured in a dose versus modulus curve, of less than 1.0 $J/cm^2$, and preferably less than 0.5 $J/cm^2$, is required, when the photoinitiator is used in the designated amount.

Optional Ingredients

The matrix composition may also comprise one or more optional ingredients, discussed infra.

(E) Component Capable of Increasing Adhesion

As discussed above, a controlled adhesion level is an important parameter of the present invention. The adhesion level should again lie within the range of between about 0.02 lb./in. and about 0.20 lb./in., preferably between about 0.04 lb./in. and about 0.15 lb./in., and more preferably between about 0.06 lb./in. and about 0.10 lb./in. as measured by T-peel test, as described, supra. Functionally, this means that the matrix material is adherent enough to the coated and inked optical fibers so as not to separate therefrom under normal use conditions, yet releasable enough to separate easily from the coated, inked fibers clearly and without removing a substantial amount of ink therefrom during, for example, splicing operations.

In order to attain this desired amount of adhesion, it may be necessary to incorporate an agent capable of increasing the adhesion level of the matrix material to a coated and inked optical fiber relative to the composition not incorporating it. This higher adhesion level might be necessary, for example, when an ink having relatively poor adhesion to the matrix material is used. This adhesion-increasing additive may be used in addition to or in lieu of a portion of the polyether-based urethane acrylate component (a).

The invention thus further comprises a process for adjusting the adhesive bond of a cured matrix material to coated and inked glass optical fibers by incorporating such adhesion-increasing component into the uncured matrix material.

When used, the adhesion-increasing component preferably comprises from about 1 to about 30 percent by weight, based on the total weight of components (a), (b), (c) and (d) only.

Suitable adhesion-increasing components include, but are not limited to, polyester-based aliphatic urethane acrylate oligomers, commercially available examples of which include cargill 1512 oligomer, from Cargill, Inc., Minneapolis, Minn., and Ebecryl 284, from Radcure Specialties, Inc., Louisville, Ky.

(F) Stabilizers

Another optional class of components includes various stabilizers. To improve shelf life (storage stability) of the uncured coating, as well as to increase thermal and oxidative stability of the cured coating, one or more stabilizers may be included in the composition. Examples of suitable stabilizers include tertiary amines such as diethylethanolamine and trihexylamine; hindered amines; organic phosphites; hindered phenols; antioxidants; mixtures thereof; and the like. Some particular examples of antioxidants which can be used include octadecyl-3-(3',5'-di-tert-butyl-4'-hydroxyphenyl) propionate; thiodiethylene bis (3,5-di-tert-butyl-4-hydroxy) hydrocinnamate; and tetrakis [methylene (3,5-di-tert-butyl-4-hydroxyhydrocinnamate)] methane.

When a stabilizer is used, it may be incorporated in an amount from about 0.1 percent to about 3.0 percent, based on the weight of the (a) through (d) ingredients. Preferably, it is included in the range from about 0.25 percent to about 2.0 percent by weight, and more preferably in the range from about 0.5 percent to about 1.5 percent by weight, based on the total weight of the (a) through (d) ingredients. Desirable properties of a stabilizer include non-migration (probably enhanced by low polarity). A preferred stabilizer is thiodiethylene bis (3,5-di-tert-butyl-4'-hydroxy) hydrocinnamate, such as Irganox 1035, from Ciba-Geigy Corporation, Ardsley, N.Y.

The matrix composition should have a viscosity of about 5,000 cps to 9,000 cps at 23° C., and a fast cure. The cured matrix material should have a modulus of over about 1,000 psi, a glass transition temperature of less than about −40° C. (onset), low surface tack, and high thermal and hydrolytic stability.

The Optical Fiber Ribbon Assembly

The invention further relates to an optical fiber ribbon assembly. The ribbon assembly generally comprises a plurality of coated, inked optical fibers held in a fixed relationship, e.g., in a parallel and planar or other prescribed arrangement, and a radiation curable matrix composition, in which the fibers are embedded, the matrix bonding the fibers in the desired arrangement. The matrix material has sufficient adhesion to the fibers to remain adhered thereto during use but is easily strippable therefrom without substantially damaging the integrity of an ink layer on the coated optical fibers.

The optical fibers which are part of the ribbon are those known in the art which are singly or dually coated before being bonded in the matrix material and which contain an ink layer on their surface, rendering each distinguishable from other fibers in the ribbon.

The optical fibers which are coated may comprise for example, a glass core and a glass cladding layer. The core, for example, may comprise silica doped with oxides of germanium or phosphorus and the cladding, a pure or doped silicate such as a fluorosilicate. Alternately, the fibers may comprise a polymer clad silica glass core. Examples of such polymer claddings include organosiloxanes such as polydimethylsiloxane or a fluorinated acrylic polymer.

The fiber coatings are of the type known in the art and preferably are radiation, e.g., ultraviolet light, cured. The coating compositions may comprise a single or a dual layer and often contain cured acrylate or methacrylate components such as urethane diacrylates. A suitable secondary coating, for example, may comprise an aromatic polyester urethane acrylate; vinyl pyrrolidone; ethoxyethoxyethylacrylate; a photoinitiator; and stabilizer.

As discussed hereinabove, in order for the optical fiber ribbons to be spliced in a reasonably easy manner, it is desirable to identify the individual fibers by color coding them. It is possible to add a coloring agent to the outermost fiber coating layer; however, this is impractical because the coating will impart its color to the apparatus used to apply it, requiring numerous sets of drawing and coating apparatuses to accommodate each color of ink used.

Thus, it is more efficacious to ink over the optical fiber coating or coatings ink-containing layers of different colors, for individual fiber identification, by any means known in the art. The applied ink composition may be variable in nature but generally is vinylic and may comprise, for example, one or more organic or inorganic pigments; a vinyl copolymer; synthetic silica; and an organic solvent. As implied, supra, the precise nature of the ink composition will dictate the amounts and nature of the adhesion-affecting components in the matrix.

The matrix composition which bonds the fibers is of the type which constitutes the present invention, i.e., one which comprises:

(a) from about 35 percent to about 98 percent by weight of an aliphatic polyether-based urethane acrylate;

(b) from about 0.5 percent to about 35 percent by weight of a monomer having a plurality of acrylate or methacrylate moieties;

(c) from about 0.5 percent to about 20 percent by weight of an acrylate or methacrylate monomer having an alkyl moiety comprising from 7 to 18 carbon atoms; and (d) from about 0 percent to about 10 percent by weight of a photoinitiator, all of said percentages by weight being based on total weight of (a), (b), (c) and (d).

One kind of ribbon structure, and a cable made from such ribbon, is described in U.S. Pat. No. 3,411,010 to Genähr et al., which is incorporated herein by reference.

Process For Preparing an Optical Fiber Ribbon

The invention comprises, in a further aspect, a process for preparing an optical fiber ribbon. Broadly, the process comprises mechanically arranging coated and inked fibers in a desired (i.e., generally planar and generally parallel) configuration; applying a matrix composition about the fibers; and curing.

A suitable but non-limitative means for applying the matrix composition to the fibers is as follows. Optical fibers which have been coated and inked over in the manner described hereinabove or in any manner known in the art may be used. The optical fibers may be mechanically arranged in the desired configuration (e.g., in a generally parallel, generally planar disposition relative to each other). The fibers may be held in the desired configuration, for example, by taping or otherwise holding the ends together. The matrix composition may be applied about the fibers by any conventional means, i.e., by dipping the fibers into a vat of the composition or pouring the material thereupon. Once the matrix composition has been applied substantially uniformly about the fibers, it may be radiation cured, preferably either by ultraviolet light irradiation or via electron beam. Optionally, the composite may be flipped over, more matrix composition applied thereto, and the matrix again cured as above. The resulting ribbon contains the fibers bonded and secured in the desired disposition (i.e., generally parallel and generally planar). The adhesive bond of the cured matrix material to the coated and inked fibers may be adjusted by incorporation into the uncured compositions of a component capable of increasing the adhesive bond of the type discussed, supra, e.g., a polyester-based aliphatic urethane acrylate oligomer.

Coatings For Substrates

Although the matrix composition has been exemplified hereinabove for use as a matrix material for coated and inked optical fibers, it should be understood to be useful in any embodiment where it is desired to coat or bind a substrate (e.g., a flexible substrate) wherein the coating has an optimized adhesion level to the substrate and particularly an ink-covered substrate. Examples of such substrates include, but are not limited to, glass, metal or plastic. For example, composition may be used as a release coating for a glass or plastic substrate having a logo printed thereon, as may be used in electronics or other industries, to identify a supplier, or in any embodiment where it is desired to temporarily protect a printed surface. For example, a logo may be protected during shipping with such a release coating, which coating may be removed by the customer. Thus, the invention, stated more broadly, is a radiation curable coating composition for coating a substrate, the coating composition comprising:

(a) from about 35 percent to about 98 percent by weight of an aliphatic polyether-based urethane acrylate;

(b) from about 0.5 percent to about 35 percent by weight of a monomer having a plurality of acrylate or methacrylate moieties;

(c) from about 0.5 percent to about 20 percent by weight of an acrylate or methacrylate monomer having an alkyl moiety comprising from 7 to 18 carbon atoms; and (d) from about 0 percent to about 10 percent by weight of a photoinitiator, all of the percentages by weight being based on total weight of (a), (b), (c) and (d).

EXAMPLES

The following Examples serve to further illustrate the invention. In these Examples and elsewhere throughout this application, all parts and percentages are by weight, on a dry solids basis, and all temperatures are in degrees centigrade (°C.) unless expressly stated to be otherwise. In all of the Examples, cure speeds were measured with an International Light IL 745-A radiometer with model A309 light bug. In the Examples and elsewhere in this application, the terms "modulus" and "Instron modulus" refer to tensile modulus.

Unlike the remainder of the application, where percentages by weight refer to the total weight of the (a) through (d) components, parts by weight in the Examples refer to the total composition described in that Example, including all components. The optional ingredients are identified by an asterisk (*) in the Examples. The optional components may be necessary for use, if the exemplified coating is to meet the rigorous requirements for a commercially acceptable matrix for optical glass fiber ribbons.

Example 1
A Coating Composition For A Flexible Substrate

A radiation-curable composition was formulated as follows:

| Ingredient | Parts by Weight |
| --- | --- |
| Ebecryl 4842 silicone modified aliphatic ether urethane acrylate, from Radcure Specialties, Inc. Louisville, Kentucky (a) | 72.28 |
| Trimethylolpropane triacrylate (b) | 17.82 |
| SR-257 stearyl acrylate, from Sartomer Company, West Chester, PA (c) | 4.95 |
| Irgacure-184 hydroxycyclohexylphenyl ketone photoinitiator, from Ciba-Geigy, Ardsley, NY (d) | 3.96 |
| Irganox-1035 thiodiethylene bis (3,5-di-tert-butyl-4-hydroxy) hydrocinnamate stabilizer, from Ciba-Geigy * | 0.99 |

The viscosity of the resulting (uncured) formulation was 6520 cps (at 25° C. using a Brookfield viscometer, model LVT, at 6 rpm, # 34 spindle).

Shelf life as a function of change in viscosity over time of the uncured formulation was determined by weighing a 50 gram sample of the liquid into a 4-ounce glass jar with a lid and heating in a 200° F. (93.3° C.) oven for 16 hours. The change in viscosity was determined to be +8.3%.

The uncured material was applied to a substrate. The substrate comprised a flat glass sheet having taped on its surface an approximately seven-to nine-mil thick radiation-cured coating overprinted with an ink layer. The radiation-cured coating comprised the following:

| Ingredient | Parts by Weight |
| --- | --- |
| vinyl pyrrolidone | 11.5 |
| ethoxyethoxyethylacrylate | 11.5 |
| Retarder/Stabilizer package | 0.99 |
| aromatic polyester urethane acrylate | 74.01 |
| 2,2-dimethoxy-2-phenyl-acetophenone photoinitiator | 2.0 |

The ink, which was orange in color, comprised pigment; a vinyl copolymer; synthetic silica and an organic solvent. It conferred an orange color to the coated, inked substrate.

The above composition was applied to the aforedescribed coated and inked substrate as an about six-mil coating using a Bird applicator. It was ultraviolet cured in air at 0.7 J/cm$^2$ using a 200 watts per inch medium pressure mercury vapor lamp.

Adhesion of the cured matrix material was determined as follows. The coated substrate was cut into a 3½×1 inch strip. A T-peel test was done using an Instron model 1122 with a crosshead speed of 10 mm/min at 23° C., range setting 100 g. An adhesion value of 0.075 (±0.011) lb./in. was measured.

The cured matrix had tensile modulus, at 23° C., of 10,930 psi glass transition temperature, as determined according to ASTM D-3418, of less than about −40° C. (onset) and good surface tack.

Water absorption of the sample was measured as follows. The cured matrix material was equilibrated at 50% (±5%)

relative humidity at 23° C. (±2° C.) for 48 hours. The sample was weighed and a weight "A" recorded. The sample was then soaked for 24 hours at 25° C. in distilled water, then patted dry and weighed. This weight was recorded as "B". The sample was next placed in a vacuum oven under 10 mm Hg pressure at 25° C. for 24 hours, removed, and again equilibrated at 50% (±5%) relative humidity at 23° C. (±2° C.) for 48 hours and weighed. This third weight was recorded as "C". Percent water absorption measured as $$\frac{B-C}{A} \times 100\%$$

was about 2.6%.

Solvent absorption of the sample was measured as follows. The cured matrix material (6-mil thickness) was cut in an approximately 2×2 inch section and weighed in a tared container. The film was immersed in ethanol for 5 minutes and then patted dry. It was returned to the tared container and reweighed after 5 minutes. The % solvent absorption was taken as the increase in weight divided by the initial weight× 100. The value was 14.2%.

Percent volatiles in the cured coating was determined by subjecting a sample cured and equilibrated as above to thermal gravimetric analysis (TGA) at 200° C. for 40 minutes in nitrogen atmosphere. A 5.12% volatiles weight loss was measured.

Oxidative induction temperature was measured by subjecting a 10 mg sample of the coating cured as above to differential scanning calorimetry in a pure oxygen atmosphere. The test was commenced at 100° C. and increased by 10° C. per minute until oxidation began, as evidenced by the beginning of a temperature exotherm. This point, the oxidative induction temperature, was measured at between about 190° C. and about 210° C.

Example 2
A Composition Having Good Adhesion and Viscosity but Slight Swelling

A formulation was made having the following components:

| Ingredients | Parts by Weight |
| --- | --- |
| Ebecryl 4842 silicone modified aliphatic ether urethane acrylate (a) | 82.0 |
| 1,6-hexanediol diacrylate (b) | 9.0 |
| SR-257 Stearyl acrylate (c) | 5.0 |
| Irgacure-184 photoinitiator (d) | 4.0 |

The uncured formulation had a viscosity of 5750 cps at 25° C. using a Brookfield viscometer, model LVT, #34 spindle at 6 rpm and a Brookfield 74R temperature controller with a Thermosel.

The formulation was coated and cured in the manner of the previous Example. Modulus of the cured coating was determined to be 1,770 psi at 23°±0.5° C., using an Instron Model 1122 fitted with a 50 kg load cell using a cross head speed of 5 mm/min and a chart speed of 200 mm/min.

Adhesion was determined in the following manner. A composition-coated and cured sheet substrate was cut into 0.8 inch-by-3 inch strips. Adhesion of the coating to the substrate was measured as in Example 1, and a value of 0.079 lb./in. was determined. Solvent absorption (ethanol) was determined, in the manner of Example 1, to be 28.8%.

Example 3
A Formulation Having Lower Adhesion Properties

The following formulation was made up:

| Ingredient | Parts by Weight |
| --- | --- |
| Ebecryl 4842 silicone modified aliphatic ether urethane acrylate (a) | 82.0 |
| Chemlink 2000, mixture of $C_{14}$ and $C_{15}$ hydrocarbon diol diacrylates from Sartomer Company (b) | 9.0 |
| SR-257 Stearyl acrylate (c) | 5.0 |
| Irgacure-184 photoinitiator (d) | 4.0 |

When coated onto a substrate, cured, and subjected to the modulus and adhesion tests of the previous Examples, a modulus of 1,320 psi and adhesion level of 0.032 lb./in. were recorded.

Example 4
A Formulation Having Somewhat High Adhesion

The following composition was formulated:

| Ingredient | Parts by Weight |
| --- | --- |
| Ebecryl 264 aliphatic ether urethane acrylate, from Radcure Specialties, Inc. (a) | 80.6 |
| Radcure isobornyl acrylate (c) | 15.3 |
| Irgacure-184 photoinitiator (d) | 4.1 |

The uncured composition had a viscosity at 25° C. of 8,550 cps, and the cured composition has a modulus of 50,800 psi, these properties measured as in the previous Examples.

Breakout was determined visually by observing the amount of ink removed from the substrate onto the cured matrix, and a value of about 1 was assigned, on a scale of 0 to 5, with 0 signifying that no ink was removed and 5 signifying that all the ink was removed from the substrate.

Exxample 5
A Formulation Having Somewhat High Adhesion and Higher Viscosity

The following composition was prepared:

| Ingredients | Parts by Weight |
| --- | --- |
| Ebecryl 264 aliphatic ether urethane acrylate (a) | 78.0 |
| Photomer 4072, trimethylolpropane propoxylate triacrylate, from Henkel Corp., Ambler, PA (b) | 18.0 |
| Irgacure-184 photoinitiator (d) | 4.0 |

The uncured composition had a viscosity of 11,920 cps, measured as in Example 1, and, when cured in the manner of previous Examples, the cured composition had a modulus of 55,600 psi and a breakout value of 1, all as measured as in the previous Examples.

Example 6

A Formulation Having Increased Adhesion

The following formulation was made:

| Ingredient | Parts by Weight |
| --- | --- |
| Ebecryl 4842 silicone modified aliphatic ether urethane acrylate (a) | 55.0 |
| Cargill 1512, aliphatic polyester urethane acrylate in 25% hexanediol diacrylate solvent from Cargill, Inc., Minneapolis, MN* | 30.0 |
| 1,6-hexanediol diacrylate (b) | 11.0 |
| Irgacure-184 photoinitiator (d) | 4.0 |

The formulation which resulted was coated onto an inked (orange) substrate and cured in the manner described in earlier Examples. The adhesion level of the formulation was shown by a spot adhesion test (performed by curing a thin coat of the material on the inked substrate and peeling the cured material off by hand) to be high enough to pull most of the ink off of the substrate.

Example 7

Another Formulation Having Increased Adhesion

The following formulation was devised:

| Ingredient | Parts by Weight |
| --- | --- |
| Ebecryl 4842 silicone modified aliphatic ether urethane acrylate (a) | 55.0 |
| Ebecryl 284 aliphatic polyester urethane diacrylate in 1,6-hexanediol diacrylate (88% oligomer solids), from Radcure Specialties, Inc.* (parts by weight based on solids plus solvent) | 28.0 |
| 1,6-hexanediol diacrylate (b) | 13.0 |
| Irgacure-184 photoinitiator (d) | 4.0 |

The formulation was coated onto a substrate and cured and the adhesion level tested as in the previous Example. Again, the coating proved to have high enough adhesion to pull most of the ink off of the substrate.

Example 8

A Composition Having Low Adhesion

The following formulation was made:

| Ingredient | Parts by Weight |
| --- | --- |
| Ebecryl 4842 silicone modified aliphatic ether urethane acrylate (a) | 82.0 |
| Tone M-100 caprolactone acrylate monomer, molecular weight 344, from Union Carbide Corporation, Danbury, CT (c) | 14.0 |
| Irgacure-184 photoinitiator (d) | 4.0 |

The formulation was coated onto a white-inked substrate as above; adhesion was measured, in the manner of Example 1, to be 0.023 lb./in.

Example 9

Another Composition Having Low Adhesion and Low Modulus

The following formulation was made:

| Ingredients | Parts by Weight |
| --- | --- |
| Ebecryl 4842 silicone modified aliphatic ether urethane acrylate (a) | 82.0 |
| Stearyl acrylate (c) | 14.0 |
| Irgacure-184 photoinitiator (d) | 4.0 |

When cured in the manner of previous Examples, the cured compositon had a modulus of 880 psi and an adhesion value of 0.023 lb./in., as measured in previous Examples.

Examples 10

Another Composition Having Low Adhesion

A formulation was made from the following:

| Ingredient | Parts by Weight |
| --- | --- |
| Ebecryl 4842 silicone modified aliphatic ether urethane acrylate (a) | 82.0 |
| Ageflex FA-12 lauryl acrylate, from CPS Chemical Company, Inc., Old Bridge, NJ (c) | 14.0 |
| Irgacure-184 photoinitiator (d) | 4.0 |

When cured and subjected to the modulus and adhesion tests of the previous Examples, a modulus of 738 psi and adhesion level of 0.031 lb./in. were noted.

Example 11

A Composition Having Acceptable Adhesion But Low Modulus

The following composition was prepared:

| Ingredient | Parts by Weight |
| --- | --- |
| Ebecryl 4842 silicone modified aliphatic ether urethane acrylate (a) | 81.0 |
| Isobornyl acrylate (c) | 15.0 |
| Irgacure-184 photoinitiator (d) | 4.0 |

The resulting uncured composition had a viscosity of 8,260 cps, measured as in Example 1. When cured as above, the material had a modulus of 900 psi and a breakout value, as described in Example 4, of 0.

Example 12

Another Composition Having Acceptable Adhesion and Good Modulus

The following composition was formulated:

| Ingredient | Parts by Weight |
| --- | --- |
| Ebecryl 4842 silicone modified aliphatic ether urethane acrylate (a) | 75.0 |
| Photomer 4072 trimethylolpropane propoxylate triacrylate (b) | 21.0 |
| Irgacure-184 (d) | 4.0 |

The resulting uncured composition had a viscosity of 9,670 cps, measured as in Example 1. When cured as in previous Examples, a modulus of 5,200 psi and breakout value of 0 were recorded.

Example 13
A Formulation Having Moderately High Adhesion

The following composition was made:

| Ingredient | Parts by Weight |
| --- | --- |
| Ebecryl 4842 silicone modified aliphatic ether urethane acrylate (a) | 82.0 |
| 1,6-hexanediol diacrylate (b) | 14.0 |
| Irgacure-184 (d) | 4.0 |

The uncured composition had a viscosity of 5,180 cps, measured as in Example 1. When cured, a modulus of 3,672 psi was measured. After coating onto a white-inked substrate and curing the formulation in accordance with previous Examples, adhesion was determined to be 0.153 lb./in. according to the procedure described in Example 1.

Comparative Example 1
A Composition Having Poor Breakout Properties

The following formulation was devised:

| Ingredient | Parts by Weight |
| --- | --- |
| Ebecryl-284 aliphatic polyester urethane acrylate, from Radcure | 66.0 |
| Chemlink 2000 mixture of $C_{14}$-$C_{15}$ hydrocarbon diol diacrylates, from Sartomer Company | 15.0 |
| Isobornyl acrylate, from Radcure | 15.0 |
| Irgacure-184 hydroxycyclophenyl ketone from Ciba Geigy | 4.0 |

The above composition had an uncured viscosity of 2,600 cps, as measured using a Brookfield Viscometer, model LVT, at 25° C., #34 spindle, at 12 rpm, and a Brookfield 74R temperature controller with a Thermosel. Uncured, the composition had a slightly yellow color.

The matrix was applied to an orange substrate of the type in Example 1 and ultraviolet cured in air at 0.7J/cm$^2$ using a 200 watts per inch medium pressure mercury vapor lamp. Modulus of the cured coating was determined to be 42,400 psi, and a breakout value of 4 was assigned, in accordance with the method of Example 4.

Comparative Example 2
A Composition Having Too High A Level of Adhesion

The following composition was formulated:

| Ingredient | Parts by Weight |
| --- | --- |
| Cargill 1512 aliphatic ester urethane acrylate, in hexanediol diacrylate | 75.76 |
| Chemlink 2000 mixture of $C_{14}$ and $C_{15}$ diol diacrylates (b) | 20.2 |
| Irgacure-184 (d) | 4.04 |

The uncured coating had a viscosity at 25° C. of 2,010 cps, measured as in Example 1.

The modulus at 23° C. was determined to be 80,000 psi. When applied to an orange substrate and cured as in previous Examples, the material was assigned a breakout value of 4.5.

Comparative Example 3
A Coating Having Poor Breakout

A mixture of equal parts by weight of the formulations of Example 4 and Comparative Example 2 was cured as above. A breakout value of 2 was assigned to the coating.

Examples 14–19
Solvent Resistance of Bonded Ribbons
Formulations having Good Breakout and Marginal Solvent Resistance Optical fiber ribbons were made from each of the formulations of Examples 2 and 13.

One-and-one-half inch strips of both kinds of ribbons were cut and placed in small vials to which were added, for each of the two types of matrix-containing ribbons, one of three solvents, respectively: isopropyl alcohol, ethyl alcohol and water. The so-treated samples were examined for appearance changes and breakout. The effects of the solvents on appearance and breakout are summarized in the following table:

| Example No. | Example 2 Matrix | Example 13 Matrix | Solvent tested | Change in Appearance | Ease of breakout relative to non-solvent treated ribbon |
| --- | --- | --- | --- | --- | --- |
| 14 | X | | Isopropyl alcohol | NO | Same |
| 15 | | X | Isopropyl alcohol | NO | Easier |
| 16 | X | | Ethanol | NO | Somewhat easier |
| 17 | | X | Ethanol | NO | Easier |
| 18 | X | | Water | NO | Not significantly easier |
| 19 | | X | Water | NO | Not significantly easier |

These results show solvent-sensitivity of the tested samples. This is believed to be related to poor crosslink density.

Examples 20–24
Solvent Sensitivity to Trichloroethane

Coated orange substrates were prepared using the coatings identified in the following Examples. Coating and curing was performed as described in preceding Examples:

Example 14 (for Example 20);

Example 2 (for Example 21);

Example 9 (for Example 22);

Example 3 (for Example 23); and

Example 10 (for Example 24).

One-inch wide strips of each coated substrate were soaked in trichloroethane for five minutes. With the exception of Example 20, each coated substrate delaminated at least partially as a result of the solvent exposure.

Example 25
Preparation of a Coated and Inked Substrate

A flat glass sheet was coated using a Bird applicator with a 6 mil coating of a commercially available, stabilized, UV-curable urethane acrylate oligomer-based composition.

The coating was UV-cured in air at 0.7J/cm$^2$ using a medium pressure 200 watts per inch mercury vapor lamp. This was in turn printed with a proprietary blue ink from Borden Packaging and Industrial Products, Cincinnati, Ohio, using a Meyer rod. The material of Example 1 was coated atop the inked substrate in the manner described in Example 1. Adhesion was measured to be 0.15 lbs/in. at 23° C. in accordance with the methods of Example 1. It was observed that some of the ink was lifted from the substrate when the matrix material was removed therefrom.

Conclusion

A radiation-curable matrix composition has been devised to possess a number of important qualities rendering it useful for various applications, e.g., for affixing coated and inked optical fibers in a ribbon configuration. The cured matrix material has a number of properties making it particularly suitable for such end uses, these properties including moisture resistance; solvent resistance; thermal, oxidative and hydrolytic stability, and so forth.

However, one property of the cured matrix material of the present invention, which is a valuable property, is its controlled and optimized adhesion level, which allows it to remain adhered to the (fiber) substrate during use, yet be strippable without substantial damage to the substrate, when required. This property is regulated by adjusting or controlling the use of either of the adhesion-decreasing component (i.e., the alkyl acrylate or methacrylate), or of the adhesion-increasing component (i.e., the polyester-based aliphatic urethane acrylate oligomer), or by a combination of the two, at appropriate levels to achieve the desired adhesion levels, in the range of 0.02 lb./in. to 0.20 lb./in.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. An optical fiber array comprising
   (1) coated and inked optical fibers, and
   (2) an ultraviolet radiation-cured matrix material for embedding and securing therein a plurality of coated and inked optical fibers in a desired configuration, said matrix material comprising the reaction product of:
   (a) from about 64 percent to about 80 percent by weight of a silicone-modified wholly aliphatic polyether-based urethane acrylate;
   (b) a sufficient amount of from about 15 percent to about 21 percent by weight of a monomer having a plurality of acrylate or methacrylate moieties per molecule to crosslink said matrix material when cured, to impart solvent resistance thereto and to increase tensile modulus;
   (c) a sufficient amount of from about 3 percent to about 8 percent by weight of a monomer selected from the group consisting of stearyl acrylate; stearyl methacrylate; isoctyl acrylate; isoctyl methacrylate; lauryl acrylate; lauryl methacrylate; caprolactone acrylate; caprolactone methacrylate; decyl acrylate; decyl methacrylate; isodecyl acrylate; and mixtures thereof to permit the cured matrix material to remain adhered to inked surfaces of said fibers under use conditions yet with sufficiently low adhesive force to make said matrix material, when cured, easily strippable, without causing substantial swelling of the matrix material;
   (d) from about 2 percent to about 7 by weight of a photoinitiator; and
   (e) optionally, from about 0.5 percent to about 1.5 percent by weight of a stabilizer;
   all of said percentages by weight being based on total weight of (a), (b), (c), and (d),
   wherein said cured matrix material is strippable from the coating on said coated and inked fibers substantially without removing said coating from said fibers, and wherein said cured matrix material has a tensile modulus over about 1,000 psi at 23°±0.5° C.

2. An optical fiber array according to claim 1 wherein the coating on said coated and inked fibers comprises a cured acrylate-containing or a cured methacrylate-containing coating material.

3. An optical fiber array of claim 1 wherein said coated and inked fibers are colored over their respective coatings by applied vinyl inks of different colors, for individual fiber identification.

4. An optical fiber array according to claim 1 wherein said coated optical fibers include ink coloration substantially upon their respective surfaces and wherein said matrix composition, when cured, is strippable from said ink coloration without removing it from said fibers.

5. An optical fiber array according to claim 1 wherein said (b) monomer present in said matrix material (2) is selected from the group consisting of trimethylolpropane triacrylate; trimethylolpropane trimethacrylate; pentaerythritol triacrylate; pentaerythritol trimethacrylate; pentaerythritol tetraacrylate; pentaerythritol tetramethacrylate; trimethylolpropane propoxylate triacrylate; trimethylolpropane propoxylate trimethacrylate; trimethylolpropane ethoxylate triacrylate; trimethylolpropane ethoxylate trimethacrylate; glycerolpropoxytriacrylate; glycerolpropoxytrimethacrylate; dipentaerythritol monohydroxy pentaacrylate; dipentaerythritol monohydroxy pentamethacrylate; $C_6$ to $C_{12}$ hydrocarbon diol diacrylates; $C_6$ to $C_{12}$ hydrocarbon diol dimethacrylates, and mixtures thereof.

6. An optical fiber array according to claim 1 wherein said (b) monomer present in said matrix material (2) comprises trimethylolpropane triacrylate.

7. An optical fiber array according to claim 1 wherein the matrix material (2) additionally comprises from about 1 to about 30 percent by weight of a polyester based aliphatic urethane acrylate oligomer which is capable of increasing adhesion of said matrix material to said coated and inked fiber relative to the composition comprising only (a) through (e).

8. The optical fiber array of claim 1 wherein said monomer (c) in (2) is stearyl acrylate.

9. An optical fiber ribbon assembly comprising:
   a plurality of glass optical fibers disposed in a generally planar and generally parallel arrangement,
   said optical fibers being coated with a coating comprising a cured acrylate-containing or a cured methacrylate-containing coating composition,
   said coated fibers being inked over their respective coatings with inks of different respective colors, for individual fiber identification, and
   an ultraviolet radiation-cured matrix disposed about said fibers and bonding them in said arrangement;
   said matrix comprising the reaction product of:
   (a) from about 64 percent to about 80 percent by weight of a silicone-modified aliphatic polyether-based urethane acrylate;
   (b) from about 10 percent to about 25 percent by weight of trimethylolpropane triacrylate;
   (c) from about 3 percent to about 8 percent by weight of stearyl acrylate;
   (d) from about 2 percent to about 7 percent by weight of a photoinitiator; and
   (e) optionally, from about 0.5 percent to about 1.5 percent by weight of a stabilizer;
   all of said percentages by weight being based on total weight of (a), (b), (c) and (d).

10. An optical fiber ribbon assembly comprising a plurality of glass optical fibers disposed in a generally parallel arrangement and an ultraviolet radiation-cured matrix bonding said fibers in said arrangement, said matrix comprising the reaction product of:
  (a) from about 64 percent to about 80 percent by weight of a silicone-modified aliphatic polyether-based urethane acrylate;
  (b) from about 15 percent to about 21 percent by weight of trimethylolpropane triacrylate;
  (c) from about 3 percent to about 8 percent by weight of stearyl acrylate;
  (d) from about 2 percent to about 7 percent by weight of hydroxycyclohexylphenyl ketone photoinitiator; and
  (e) from about 0.5 percent to about 1.5 percent by weight of thiodiethylene bis (3, 5-di-tert-butyl-4-hydroxy) hydrocinnamate;
  all of said percentages by weight being based on total weight of (a), (b), (c) and (d).

11. A process for preparing an optical fiber array comprising:

arranging optical fibers in a generally desired arrangement;

applying about said fibers the matrix composition of claim 1; and curing said matrix composition by ultraviolet irradiation or via electron beam, thereby securing said fibers in said arrangement.

12. A process for preparing an optical fiber array from a plurality of coated and inked glass optical fibers, wherein said optical fibers are covered with a coating comprising a cured acrylate-containing or a cured methacrylate-containing coating composition, and wherein said coated fibers are inked over their respective coatings with inks of different respective colors, for individual fiber identification, said process comprising:

aligning said plurality of coated, inked fibers in a generally planar, generally parallel disposition;

disposing matrix composition comprising components (a)–(e) according to claim 10 about said fibers; and curing said matrix by ultraviolet irradiation or via electron beam to bond said fibers in said disposition.

13. An optical fiber array comprising (1) coated optical fibers, and (2) a radiation-cured release matrix material for embedding and securing therein a plurality of coated optical fibers in a desired configuration, in which said coated optical fibers are disposed in a desired relationship to each other, to form a unitary structure, said structure being produced by arranging said coated optical fibers in said desired relationship, then applying liquid matrix composition to said coated optical fibers to embed them therein and then curing said liquid composition by exposure to curing radiation, said matrix material comprising the cured reaction product of:
  (a) from about 35 percent to about 98 percent by weight of a silicone-modified wholly aliphatic polyether-based urethane acrylate;
  (b) a sufficient amount of from about 0.5 percent to about 35 percent by weight of a monomer having a plurality of acrylate or methacrylate moieties per monomer molecule, to crosslink said matrix composition when cured, to impart solvent resistance thereto and to increase tensile modulus;
  (c) a sufficient amount of from about 0.5 percent to about 20 percent by weight of a monoacrylate or monomethacrylate monomer having an alkyl moiety comprising from 7 to 18 carbon atoms to permit the cured matrix composition to remain adhered to said inked surface under use conditions yet with sufficiently low adhesive force to make said matrix composition easily strippable, without causing substantial swelling of the matrix composition; and
  (d) from about 0 percent to about 10 percent by weight of a photoinitiator;
  all of said percentages by weight being based on total weight of (a), (b), (c) and (d),
  wherein said matrix material is strippable from the coating on said coated fibers substantially without removing said coating from said fibers and wherein said matrix material has a tensile modulus over about 1,000 psi at 23°±0.5° C.

14. The optical fiber array of claim 13, wherein said composition, when cured, has a tensile modulus over about 3,600 psi at 23°±0.5° C.

* * * * *